United States Patent
Yoon (10) Patent No.: US 9,335,583 B2
(45) Date of Patent: May 10, 2016

(54) LIQUID CRYSTAL DISPLAY DEVICE COMPRISING AN ADHESIVE LAYER WITH FIRST AND SECOND ADHESIVE SURFACES FORMED BETWEEN A LIQUID CRYSTAL PANEL AND A BACKLIGHT UNIT

(71) Applicant: LG Display Co., Ltd., Seoul (KR)

(72) Inventor: Jung Ki Yoon, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 390 days.

(21) Appl. No.: 13/675,131

(22) Filed: Nov. 13, 2012

(65) Prior Publication Data

US 2013/0342786 A1    Dec. 26, 2013

(30) Foreign Application Priority Data

Jun. 21, 2012    (KR) .......................... 10-2012-0066533

(51) Int. Cl.
*G02F 1/1333*    (2006.01)
*G02F 1/1335*    (2006.01)

(52) U.S. Cl.
CPC .. *G02F 1/1336* (2013.01); *G02F 2001/133302* (2013.01); *G02F 2201/54* (2013.01); *G02F 2202/28* (2013.01)

(58) Field of Classification Search
CPC .............. G02F 1/1336; G02F 2202/28; G02F 2001/133302
USPC ........................................................ 349/122
See application file for complete search history.

(56) References Cited

U.S. PATENT DOCUMENTS

2010/0171900 A1    7/2010    Lee
2012/0062825 A1    3/2012    Seo et al.

FOREIGN PATENT DOCUMENTS

| CN | 101609222 A | 12/2009 | |
| CN | 101681040 A | 3/2010 | |
| KR | 20110042478 A | 4/2011 | |
| KR | 1020110042478 | * 4/2011 | ............. 349/122 |
| KR | 20120027709 A | 3/2012 | |

OTHER PUBLICATIONS

The First Office Action dated Jun. 26, 2015 from The State Intellectual Property Office of the People's Republic of China in counterpart Chinese application No. 201210526210.5.

* cited by examiner

*Primary Examiner* — Paul Lee
(74) *Attorney, Agent, or Firm* — Morgan, Lewis & Bockius LLP (57) ABSTRACT

Provided is an LCD device for preventing light leakage. The LCD device includes a liquid crystal panel, a backlight unit, and an adhesive layer. The backlight unit is disposed under the liquid crystal panel, and emits light. The adhesive layer is formed between the liquid crystal panel and the backlight unit, and includes a first adhesive surface adhered to the backlight unit and a second adhesive surface adhered to the liquid crystal panel. The first and second adhesive surfaces are alternately disposed along at least one side of the backlight unit.

20 Claims, 7 Drawing Sheets

FIG. 1

[ Related Art ]

LIQUID CRYSTAL DISPLAY DEVICE COMPRISING AN ADHESIVE LAYER WITH FIRST AND SECOND ADHESIVE SURFACES FORMED BETWEEN A LIQUID CRYSTAL PANEL AND A BACKLIGHT UNIT

CROSS-REFERENCE TO RELATED APPLICATIONS

This application claims the benefit of the Korean Patent Application No. 10-2012-0066533 filed on Jun. 21, 2012, which is hereby incorporated by reference as if fully set forth herein.

BACKGROUND

1. Field of the Invention

The present invention relates to a liquid crystal display (LCD) device, and more particularly, to an LCD device for preventing light leakage due to the flexure of a liquid crystal panel.

2. Discussion of the Related Art

With the advancement of various portable electronic devices such as mobile terminals and notebook computers, the demand for Flat Panel Display (FPD) devices applied to the portable electronic devices are explosively increasing.

LCD devices, plasma display panels (PDPs), field emission display (FED) devices, and light emitting diode (LED) display devices are actively researched as FPD devices. In such FPD devices, the application fields of LCD devices are being expanded because the LCD devices are easily manufactured, have good drivability of drivers, and realize an high-quality image and a large screen.

LCD devices include a first substrate, a second substrate, and a liquid crystal layer formed between the first and second substrates. The LCD devices are devices in which the alignment of liquid crystal is adjusted with an electric field applied to the liquid crystal layer, and thus, light transmittance is adjusted, thereby displaying an image.

LCD devices are variously developed in a twisted nematic (TN) mode, a vertical alignment (VA) mode, an in-plane switching (IPS) mode, or a fringe field switching (FFS) mode according to a scheme of adjusting the alignment of liquid crystal.

In IPS-mode or VA-mode LCD devices among the above-described LCD devices, a lower polarizer and an upper polarizer are respectively attached to both surfaces of a liquid crystal panel such that the 0-degree optical axis of the lower polarizer crosses the 90-degree optical axis of the upper polarizer. In the IPS-mode or VA-mode LCD devices, the flexure of the liquid crystal panel is caused by a contraction difference between the lower polarizer and the upper polarizer in a thermal environment or a wet-heat environment. In the IPS-mode or VA-mode LCD devices, since the lower polarizer and the upper polarizer are respectively attached to both surfaces of the liquid crystal panel such that the 0-degree optical axis of the lower polarizer cross the 90-degree optical axis of the upper polarizer, the vertical axis direction of the upper polarizer is asymmetric with that of the lower polarizer. For this reason, in the IPS-mode or VA-mode LCD devices, the overall flexure of the liquid crystal panel occurs in a direction in which flexure is large.

In the IPS-mode or VA-mode LCD devices, the flexure of the liquid crystal panel becomes the major cause of light leakage. To provide a detailed description, in the IPS-mode or VA-mode LCD devices, as described above, since the liquid crystal panel is bent, a stress is applied to the liquid crystal panel in fixing the liquid crystal panel to a backlight unit. In this case, with a voltage not being applied to the liquid crystal panel, liquid crystal injected into the liquid crystal panel has fluidity, and thus, the liquid crystal becomes non-uniform due to the stress. Particularly, the IPS-mode or VA-mode LCD devices displays a black screen when a voltage for driving liquid crystal is not applied, and thus, light leakage due to non-uniformity of the liquid crystal is discerned with naked eyes.

Hereinafter, a related art LCD device will be described in detail with reference to FIGS. 1 and 2.

Figure 1:
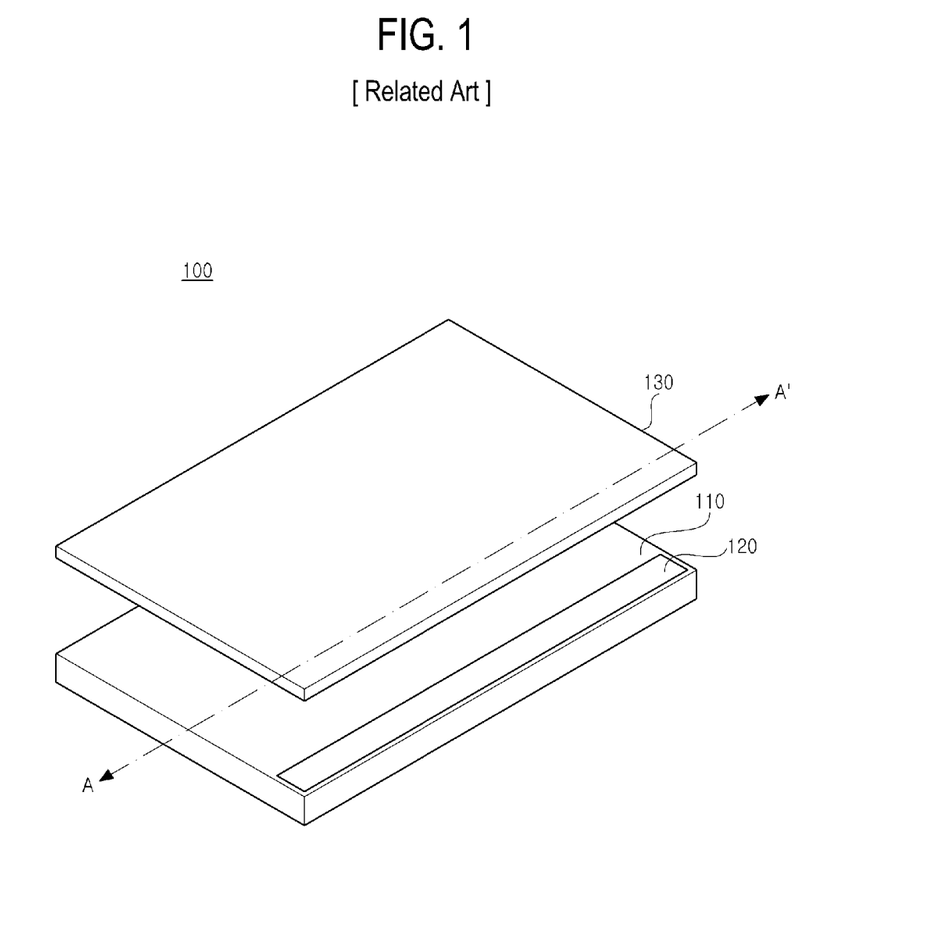
FIG. 1 is a perspective view schematically illustrating a related art LCD device.

FIG. 1 is a perspective view schematically illustrating a related art LCD device. FIGS. 2A and 2B are sectional views taken along line A-A' of FIG. 1.

Figure 2A:
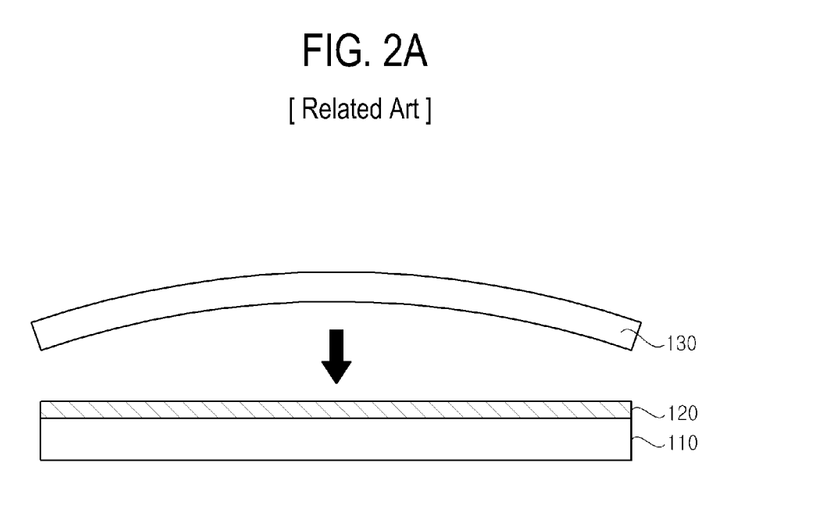
FIGS. 2A and 2B are sectional views taken along line A-A' of FIG. 1.
Figure 2B:
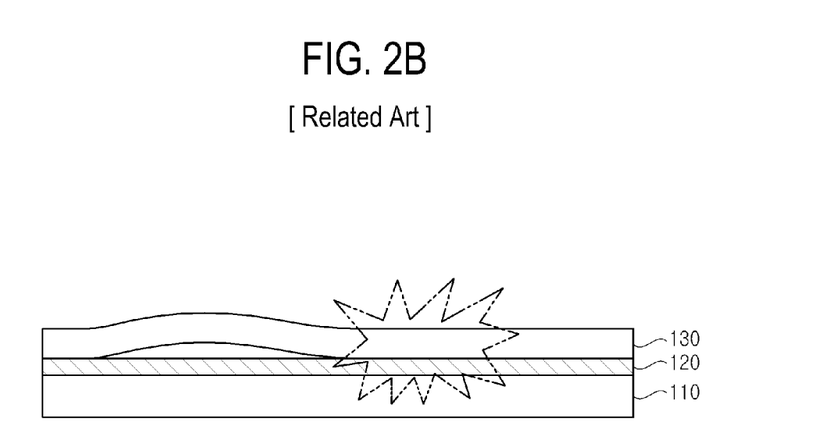

Referring to FIG. 1 and FIGS. 2A and 2B, a related art IPS-mode or VA-mode LCD device 100 includes a backlight unit 110, an adhesive layer 120, and a liquid crystal panel 130.

The backlight unit 110 includes a light source for supplying light to the liquid crystal panel 130, and an optical sheet for uniformly supplying light, emitted from the light source, toward the liquid crystal panel 130.

The adhesive layer 120 is formed between the backlight unit 110 and the liquid crystal panel 130 in a double-sided adhesive tape type. In this case, a bottom of the adhesive layer 120 is adhered to the backlight unit 110, and a top of the adhesive layer 120 is adhered to a lower polarizer (not shown) adhered to a rear surface of the liquid crystal panel 130.

The liquid crystal panel 130 includes a first substrate with a color filter array formed therein, a second substrate with a thin film transistor (TFT) array formed therein, and a liquid crystal layer formed between the first and second substrates.

The liquid crystal panel 130 is disposed on the backlight unit 110 with the adhesive layer 120 formed therein, and coupled to the backlight unit 110 with the adhesive layer 120. In this case, as illustrated in FIG. 2B, the liquid crystal panel 130 is deformed. In the liquid crystal panel 130, liquid crystal becomes non-uniform due to a stress, causing light leakage.

SUMMARY

Accordingly, the present invention is directed to an LCD device that substantially obviates one or more problems due to limitations and disadvantages of the related art.

An aspect of the present invention is directed to provide an LCD device for preventing light leakage.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a liquid crystal panel; a backlight unit disposed under the liquid crystal panel, and emitting light; and an adhesive layer formed between the liquid crystal panel and the backlight unit, and including a first adhesive surface adhered to the backlight unit and a second adhesive surface adhered to the liquid crystal panel, the first and second adhesive surfaces being alternately disposed along at least one side of the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

In description of embodiments of the present invention, when a structure is described as being formed at an upper portion/lower portion of another structure or on/under the other structure, this description should be construed as including a case where the structures contact each other and moreover a case where a third structure is disposed therebetween. However, when the term "just on" or "just under" is used, it should be restrictively construed that structures contact each other.

Figure 3:
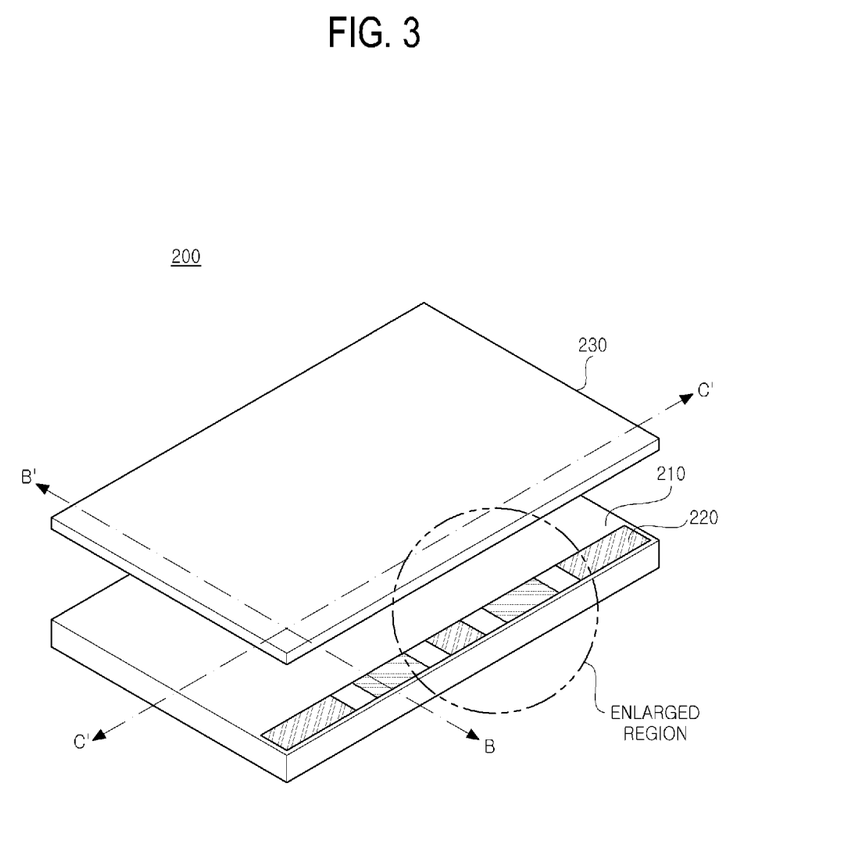
FIG. 3 is a perspective view schematically illustrating an LCD device according to a first embodiment of the present invention.

FIG. 3 is a perspective view schematically illustrating an LCD device according to a first embodiment of the present invention.

Referring to FIG. 3, an LCD device 200 according to an embodiment of the present invention includes a backlight unit 210, an adhesive layer 220, and a liquid crystal panel 230.

The backlight unit 210 is disposed under the liquid crystal panel 230, and supplies light to the liquid crystal panel 230.

The liquid crystal panel 230 adjusts the light transmittance of liquid crystal, thereby displaying an image. The liquid crystal panel 230 applied to the LCD device 200 may be implemented in various modes, known to those skilled in the art, such as a TN mode, a VA mode, an IPS mode, and an FFS mode.

The adhesive layer 220 is formed between the backlight unit 210 and the liquid crystal panel 230, and fixes the liquid crystal panel 230 to the backlight unit 210.

Hereinafter, elements of the LCD device 200 according to an embodiment of the present invention will be described in more detail.

Figure 4:
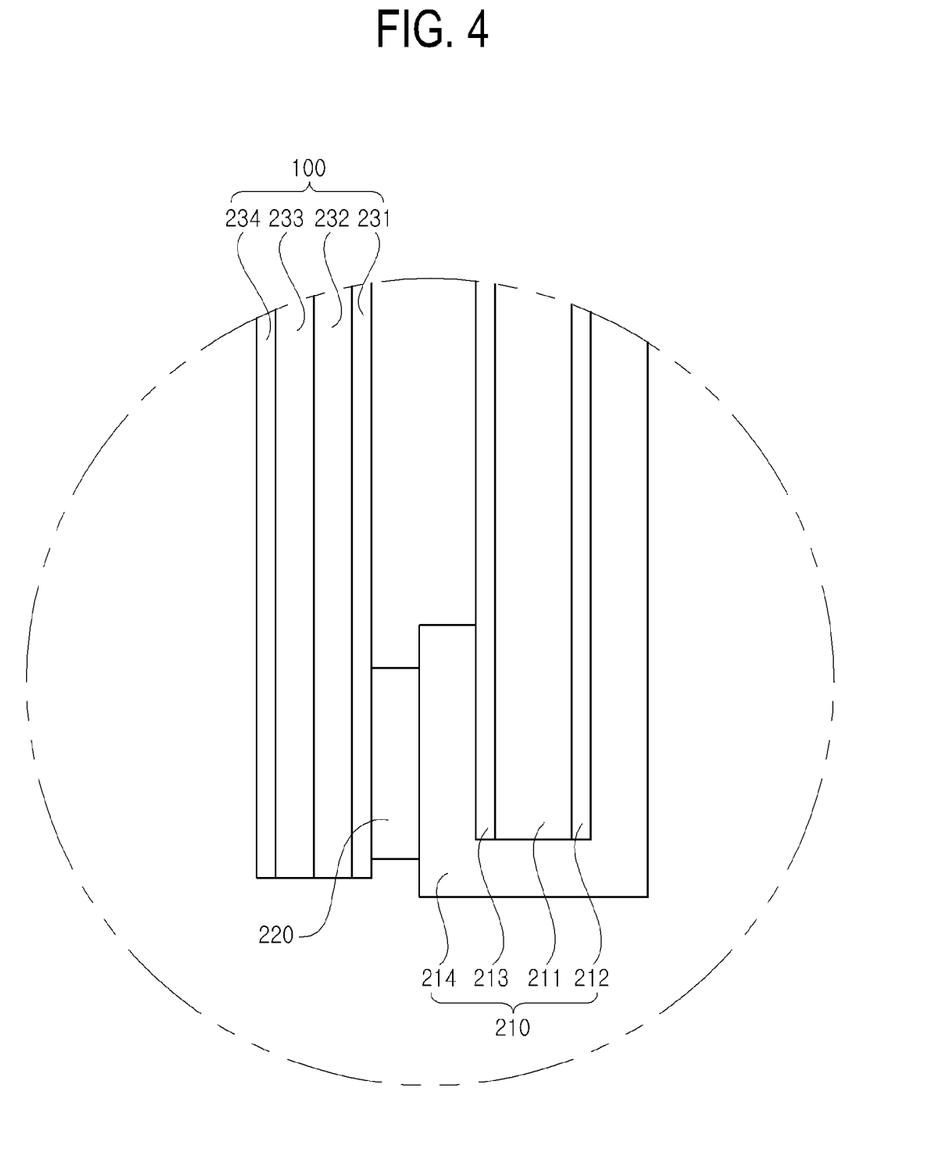
FIG. 4 is a sectional view taken along line B-B' of an enlarged region of FIG. 3.

FIG. 4 is a sectional view taken along line B-B' of an enlarged region of FIG. 3.

First, as illustrated in FIG. 4, the backlight unit 210 includes a light guide panel 211, a reflective sheet 212, an optical sheet 213, and a cover bottom 214.

The light guide panel 211 is formed in a flat panel type to have a light incident surface, and travels light, which is incident from a light source (not shown) to the light incident surface, toward the liquid crystal panel 230. Here, the light source may include a substrate and a plurality of LEDs mounted on the substrate, but is not limited thereto. As another example, the light source may include a cold cathode fluorescent lamp (CCFL).

The reflective sheet 212 is disposed at a rear surface of the light guide panel 211 and reflects light, which is incident from the light guide panel 211, toward the light guide panel 211, thus preventing light from being leaked to under the light guide panel 211.

The optical sheet 213 is disposed on the light guide panel 211 and enables light incident from the light guide panel 211 to be uniformly supplied to the liquid crystal panel 230. To this end, the optical sheet 213 may include a lower diffusive sheet, a lower prism sheet, an upper prism sheet, and an upper diffusive sheet.

The lower diffusive sheet is disposed on the light guide panel 211, and diffuses light incident from the light guide panel 211 to irradiate the light onto the lower prism sheet.

The lower prism sheet is disposed on the lower diffusive sheet, and collects light incident from the lower diffusive sheet in a first direction, thereby irradiating the collected light onto the upper prism sheet. Here, the first direction may correspond to a long side direction or short side direction of the light guide panel 231.

The upper prism sheet is disposed on the lower prism sheet, and collects light incident from the lower prism sheet in a second direction, thereby irradiating the collected light onto the upper diffusive sheet. Here, the second direction may be a direction perpendicular to the first direction.

The upper diffusive sheet is disposed on the upper prism sheet, and diffuses light incident from the upper prism sheet to irradiate the diffused light onto the liquid crystal panel 230.

At least one of the lower diffusive sheet, lower prism sheet, upper prism sheet, and upper diffusive sheet may not be provided according to the luminance characteristic of light based on the structure of the backlight unit 210.

The cover bottom 214 is formed in a tetragonal frame shape with a receiving space prepared therein. The receiving space receives the light guide panel 211, the reflective sheet 212, and the optical sheet 213.

The cover bottom 214 includes a bottom surface, a side wall, and a disposing surface on which the liquid crystal panel 230 is disposed. The side wall is extended from the bottom surface, and formed as four to surround side surfaces of the light guide panel 211. The disposing surface is extended from at least one of the four side walls in parallel to the bottom surface, and formed to have an edge portion of the liquid crystal panel 230.

The adhesive layer 220 is formed on the disposing surface of the cover bottom 214. A lower surface of the adhesive layer 220 is partially adhered to the backlight unit 110, and an upper surface of the adhesive layer 220 is partially adhered to a rear surface of the liquid crystal panel 130. Therefore, the adhesive layer 220 can prevent the movement of the liquid crystal panel 230 disposed on the backlight unit 210. Details of the adhesive layer 220 will be described in more detail with reference to FIG. 5.

Next, as illustrated in FIG. 4, the liquid crystal panel 230 includes a lower polarizer 231, a lower substrate 232, an upper substrate 233, and an upper polarizer 234.

The lower substrate 232 includes a plurality of pixels (not shown) respectively formed in a plurality of areas that are defined by intersections between a plurality of gate lines (not shown) and a plurality of data lines (not shown).

Each of the pixel may include a TFT (not shown) connected to a gate line and a data line, a pixel electrode connected to the TFT, and a common electrode that is formed adjacently to the pixel electrode and receives a common voltage.

In the lower substrate 232, an electric field corresponding to a difference voltage between the common voltage and a data voltage applied to each pixel is generated, and the light transmittance of the liquid crystal layer is adjusted with the electric field.

The lower polarizer 231 is formed at a rear surface of the lower substrate 232, and polarizes incident light to irradiate the polarized light onto the lower substrate 232.

The upper substrate 233 includes a plurality of color filters corresponding to the respective pixels formed in the lower substrate 232, and is facing-coupled to the lower substrate 232 with the liquid crystal layer therebetween.

A common electrode, receiving the common voltage according to a driving mode of the liquid crystal layer, may be formed at the upper substrate 233. In the upper substrate 233, the color filters filter incident light passing through the liquid crystal layer to emit certain color light to the outside, thereby enabling a certain color image to be displayed on the liquid crystal panel 230.

The upper polarizer 234 is formed over the upper substrate 233, and polarizes incident light passing through the upper substrate 233 to emit the polarized light to the outside.

Figure 5:
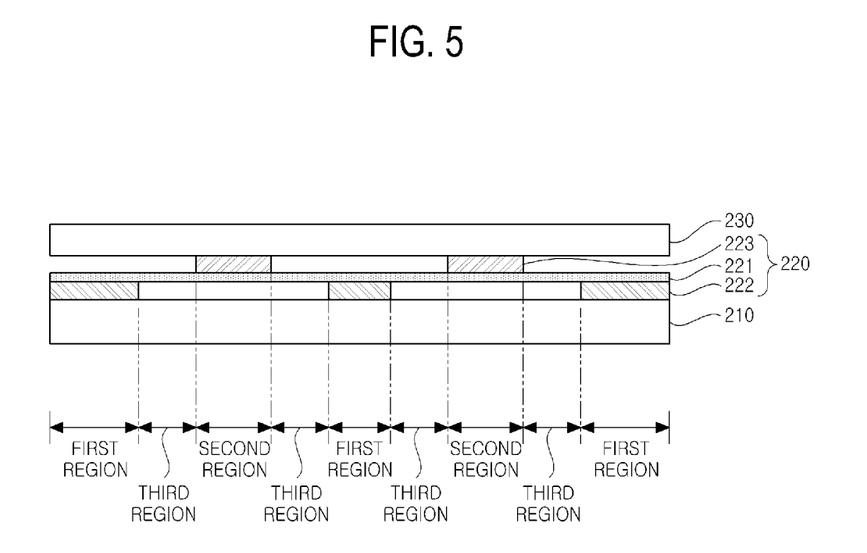
FIG. 5 is a sectional view taken along line C-C' of FIG. 3.

FIG. 5 is a sectional view taken along line C-C' of FIG. 3.

As seen in FIG. 5, the adhesive layer 220 is formed between the backlight unit 210 and the liquid crystal panel 230. The adhesive layer 220 includes a base film 221 formed of polyethylene terephthalate (PET) resin, a first adhesive layer 222 formed under the base film 221, and a second adhesive layer 223 formed on the base film 221.

The base film 221 is formed between the backlight unit 210 and the liquid crystal panel 230. The base film 221 is formed along at least one side of the LCD device 200 to have a certain width.

In FIG. 3, the base film 221 is disposed on a lower side of the LCD device 200, but is not limited thereto. As another example, the base film 221 may be disposed on at least one of an upper side, a left side, and a right side of the LCD device 200.

The first adhesive layer 222 is formed in a double-sided adhesive tape type, between the base film 221 and the backlight unit 210. In this case, a lower surface of the first adhesive layer 222 is adhered to the backlight unit 210, and an upper surface of the first adhesive layer 222 is adhered to the base film 221. Hereinafter, the lower surface of the first adhesive layer 222 adhered to the backlight unit 210 is referred to as a first adhesive surface.

The first adhesive surface, as illustrated in FIG. 5, is formed in plurality in the first adhesive layer 222, and the plurality of first adhesive surfaces are separated from each other by a certain distance.

The second adhesive layer 223 is formed in a double-sided adhesive tape type, between the liquid crystal panel 230 and the base film 221. The first and second adhesive layers 222 and 223 are zigzag disposed with the base film 221 therebetween. In this case, a lower surface of the second adhesive layer 223 is adhered to the base film 221, and an upper surface of the second adhesive layer 223 is adhered to the liquid crystal panel 230. Hereinafter, the lower surface of the second adhesive layer 223 adhered to the backlight unit 230 is referred to as a second adhesive surface.

The second adhesive surface, as illustrated in FIG. 5, is formed in plurality in the second adhesive layer 223, and the plurality of second adhesive surfaces are separated from each other by a certain distance. Also, the second adhesive surface is disposed between the first adhesive surfaces.

According to an embodiment, the second adhesive layer 223 may be formed of the same adhesive material as that of the first adhesive layer 222. Therefore, the second adhesive surface may have the same adhesive strength as that of the first adhesive surface.

According to another embodiment, the second adhesive layer 223 may be formed of an adhesive material different from that of the first adhesive layer 222. In more detail, the second adhesive surface may have adhesive strength less than that of the first adhesive surface. This is because the liquid crystal panel 230 may be deformed due to the adhesive strength of the second adhesive surface, and, due to the deformation, light leakage occurs in the LCD device 200. That is, as the adhesive strength of the second adhesive surface adhered to the liquid crystal panel 230 becomes weaker, the light leakage of the LCD device 200 can be reduced.

The adhesive layer 220 including the elements includes a first region in which the first adhesive surface is formed, and a second region in which the second adhesive surface is formed. The first and second regions are alternately disposed, and do not overlap.

Also, the first and second regions may have a certain separation distance. Therefore, the adhesive layer 220 may further include a third region in which the first and second adhesive surfaces are not formed. In this case, separation distances between adjacent first and second regions may be equal or different.

The separation distance between the first and second regions will be described in more detail with reference to FIGS. 6 to 9, according to various embodiments.

Figure 6:
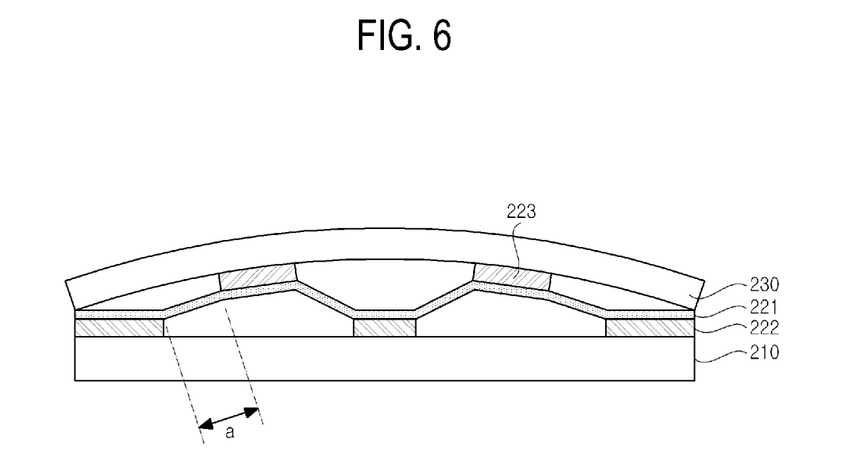
FIG. 6 is a sectional view illustrating an LCD device according to a second embodiment of the present invention.

FIG. 6 is a sectional view illustrating an LCD device according to a second embodiment of the present invention.

Referring to FIG. 6, in an LCD device 200 according to the second embodiment of the present invention, an adhesive layer 220 includes a first region in which a first adhesive surface is formed, and a second region in which a second adhesive surface is formed.

The first and second regions are alternately formed, and do not overlap. Also, the first and second regions are formed apart from each other. In this case, a separation distance "a" between the first and second regions may be determined according to the flexure amount of a liquid crystal panel 230 and the flexure amount of a backlight unit 210.

Before describing the separation distance "a" between the first and second regions, the flexure amount of the liquid crystal panel 230 and the flexure amount of the backlight unit 210 will be described in more detail.

The liquid crystal panel 230 is bent by the lower polarizer 231 and the upper polarizer 234. Here, the flexure of the liquid crystal panel 230 by the lower polarizer 231 is asymmetric with that of the liquid crystal panel 230 by the upper polarizer 234, in which case the liquid crystal panel 230 is overall bent in a direction in which flexure is large.

The liquid crystal panel 230 may overall have a concave shape or a convex shape according to a flexure difference between the lower polarizer 231 and the upper polarizer 234. Also, when flexure by the lower polarizer 231 is symmetric with flexure by the upper polarizer 234, the liquid crystal panel 230 may have a flat shape.

The backlight unit 210 may a concave shape, a convex shape, or a flat shape depending on the shape of the light guide panel 211.

When the backlight unit 210 or liquid crystal panel 230 having the above-described shape is flat in shape, a flexure amount becomes 0. Furthermore, when the backlight unit 210 or liquid crystal panel 230 is concave in shape, a flexure amount becomes a negative number, and, when the backlight unit 210 or liquid crystal panel 230 is convex in shape, a flexure amount becomes a positive number. In this case, the more concave the shape, the lower the flexure amount, and, the more convex the shape, the higher the flexure amount.

For example, the liquid crystal panel 230 of FIG. 6 has a convex shape, and thus, the flexure amount of the liquid crystal panel 230 is higher than 0. The backlight unit 210 of FIG. 6 has a flat shape, and thus, the flexure amount of the backlight unit 210 is close to 0.

The separation distance "a" between the first and second regions may be determined according to the flexure amount of the liquid crystal panel 230 and the flexure amount of the backlight unit 210 which have been described above.

The separation distance "a" may be proportional to a difference between the flexure amount of the liquid crystal panel 230 and the flexure amount of the backlight unit 210.

For example, in the LCD device 200 of FIG. 6, when the shape of the liquid crystal panel 230 becomes more convex, the difference between the flexure amount of the liquid crystal panel 230 and the flexure amount of the backlight unit 210 increases. Therefore, the separation distance "a" may increase.

The reason is because when the separation distance "a" is not sufficiently secured between the first and second regions, the first adhesive surface adhered to the backlight unit 210 pulls the second adhesive surface adhered to the liquid crystal panel 230, and thus, a stress is applied to the liquid crystal panel 230.

As another example, in the LCD device 200 of FIG. 6, when the shape of the liquid crystal panel 230 becomes more flat, the difference between the flexure amount of the liquid crystal panel 230 and the flexure amount of the backlight unit 210 decreases. Therefore, the separation distance "a" may decrease.

The reason is because when the liquid crystal panel 230 is not fixed by the second adhesive layer 223, the lower polarizer 231 of the liquid crystal panel 230 is deformed due to heat which is generated in the backlight unit 210. To provide a more detail description, the greater the separation distance "a" between the first and second regions, the less the second region with the second adhesive layer 223 formed therein. In the liquid crystal panel 230, therefore, an area adhered to the second adhesive layer 223 decreases, but an area exposed by heat which is generated in the backlight unit 210 increases.

Figure 7:
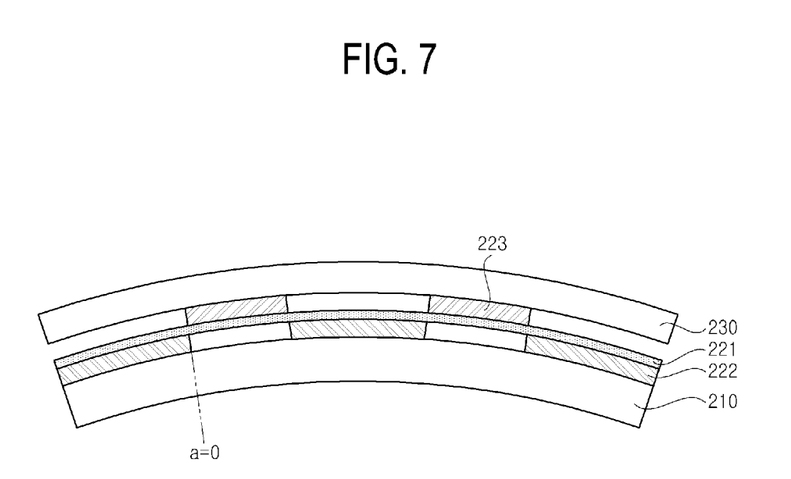
FIG. 7 is a sectional view illustrating an LCD device according to a third embodiment of the present invention.

FIG. 7 is a sectional view illustrating an LCD device according to a third embodiment of the present invention.

Referring to FIG. 7, in an LCD device 200 according to the third embodiment of the present invention, an adhesive layer 220 includes a first region in which a first adhesive surface is formed, and a second region in which a second adhesive surface is formed.

The first and second regions are alternately formed, and do not overlap. Also, the first and second regions may not be separated from each other. That is, as illustrated in FIG. 7, a separation distance "a" between the first and second regions may become 0.

Considering that the lower substrate 231 of a liquid crystal panel 230 is deformed due to heat which is generated in a backlight unit 210, the separation distance "a" between the first and second regions may be short.

However, even though a difference between the flexure amount of the liquid crystal panel 230 and the flexure amount of the backlight unit 210 is large, if the separation distance "a" between the first and second regions is short, a stress is applied to the liquid crystal panel 230, causing light leakage.

Therefore, when the difference between the flexure amount of the liquid crystal panel 230 and the flexure amount of the backlight unit 210 is close to 0, the adhesive layer 220 according to the third embodiment of the present invention may be applied to the LCD device 200.

That is, the adhesive layer 220 of FIG. 7 may be applied to the LCD device 200 in which the liquid crystal panel 230 and the backlight unit 210 have the same shape and are disposed in parallel.

Figure 8:
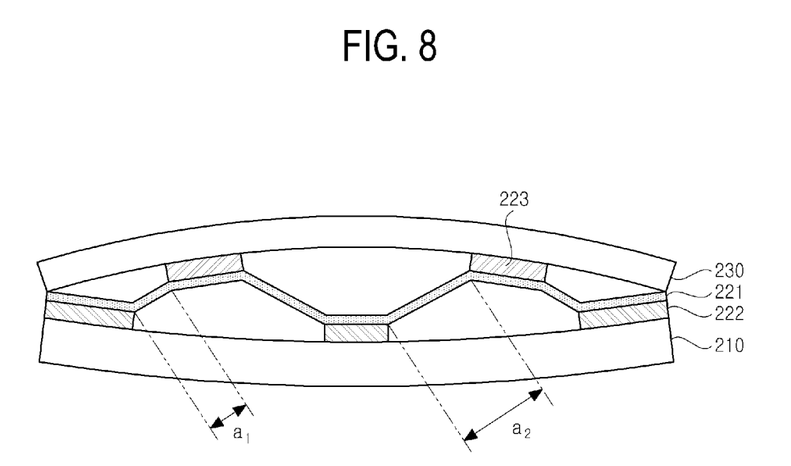
FIG. 8 is a sectional view illustrating an LCD device according to a fourth embodiment of the present invention.

FIG. 8 is a sectional view illustrating an LCD device according to a fourth embodiment of the present invention.

Referring to FIG. 8, in an LCD device 200 according to the fourth embodiment of the present invention, an adhesive layer 220 includes a first region in which a first adhesive surface is formed, and a second region in which a second adhesive surface is formed.

The first and second regions are alternately formed, and do not overlap. Also, the first and second regions may be formed apart from each other. In this case, as illustrated in FIG. 7, a separation distance "a" between the first and second regions may be proportional to a gap between the liquid crystal panel 230 and the backlight unit 210.

When a value of the flexure amount of a backlight unit 210 subtracted from the flexure amount of a liquid crystal panel 230 is greater than 0, the gap between the liquid crystal panel 230 and the backlight unit 210 increases progressively closer to the middle. Therefore, the separation distance "a" between the first and second regions may increase progressively closer to the middle of the adhesive layer 220.

For example, as illustrated in FIG. 8, when the liquid crystal panel 230 has a convex shape and the backlight unit 210 has a concave shape, in the adhesive layer 220 according to the fourth embodiment of the present invention, a second separation distance "a2" may be greater than a first separation distance "a1". Here, the first separation "a1" denotes a separation distance between a first region formed in an edge of the adhesive layer 220 and a second region adjacent thereto, and the second separation distance "a2" denotes a separation distance "a2" between a first region formed in the middle of the adhesive layer 220 and a second region adjacent thereto.

The liquid crystal panel 230 and the backlight unit 210 are not limited to the shape of FIG. 8, and a value of the flexure amount of the backlight unit 210 subtracted from the flexure amount of the liquid crystal panel 230 is greater than 0.

For example, the adhesive layer 220 according to the fourth embodiment of the present invention may be formed between the liquid crystal panel 230 having a flat shape and the backlight unit 210 having a concave shape.

Figure 9:
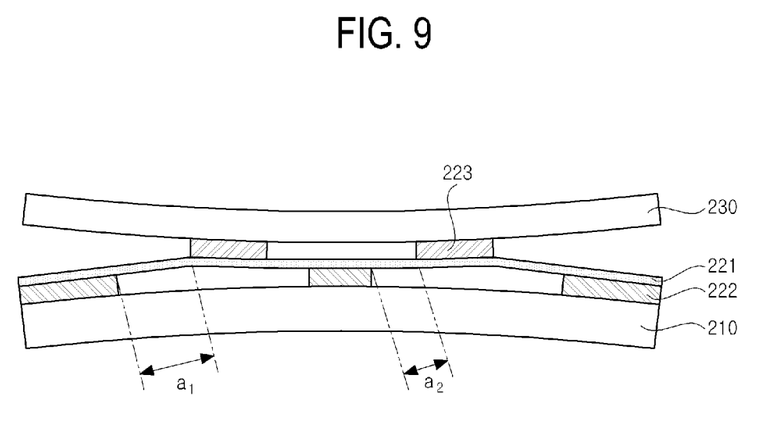
FIG. 9 is a sectional view illustrating an LCD device according to a fifth embodiment of the present invention.

FIG. 9 is a sectional view illustrating an LCD device according to a fifth embodiment of the present invention.

Referring to FIG. 9, in an LCD device 200 according to the fifth embodiment of the present invention, an adhesive layer 220 includes a first region in which a first adhesive surface is formed, and a second region in which a second adhesive surface is formed.

The first and second regions are alternately formed, and do not overlap. Also, the first and second regions may be formed apart from each other. In this case, as illustrated in FIG. 7, a separation distance "a" between the first and second regions may be proportional to a gap between the liquid crystal panel 230 and the backlight unit 210.

When a value of the flexure amount of a backlight unit 210 subtracted from the flexure amount of a liquid crystal panel 230 is less than 0, the gap between the liquid crystal panel 230 and the backlight unit 210 increases progressively farther apart from the middle. Therefore, the separation distance "a" between the first and second regions may increase progressively farther apart from the middle of the adhesive layer 220.

For example, as illustrated in FIG. 9, when the liquid crystal panel 230 has a concave shape and the backlight unit 210 has a convex shape, in the adhesive layer 220 according to the fifth embodiment of the present invention, a first separation distance "a1" may be greater than a second separation distance "a2". Here, the first separation "a1" denotes a separation distance between a first region formed in an edge of the adhesive layer 220 and a second region adjacent thereto, and the second separation distance "a2" denotes a separation distance "a2" between a first region formed in the middle of the adhesive layer 220 and a second region adjacent thereto.

The liquid crystal panel 230 and the backlight unit 210 are not limited to the shape of FIG. 9, and a value of the flexure amount of the backlight unit 210 subtracted from the flexure amount of the liquid crystal panel 230 is less than 0.

For example, the adhesive layer 220 according to the fifth embodiment of the present invention may be formed between the liquid crystal panel 230 having a flat shape and the backlight unit 210 having a convex shape.

According to the present invention, a stress applied to the liquid crystal panel can be reduced by using the adhesive layer in which the first adhesive surface adhered to the liquid crystal panel and the second adhesive surface adhered to the backlight unit are alternately disposed, thus preventing light leakage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
  a liquid crystal panel;
  a backlight unit disposed under the liquid crystal panel, and emitting light; and
  an adhesive layer formed between the liquid crystal panel and the backlight unit, and comprising a first adhesive surface adhered to the backlight unit and a second adhesive surface adhered to the liquid crystal panel, the first and second adhesive surfaces being alternately disposed along at least one side of the backlight unit,
  wherein the adhesive layer comprises:
    a first region, the first adhesive surface being formed in the first region; and
    a second region, the second adhesive surface being formed in the second region, and the first and second regions being disposed apart from each other,
  wherein a value of the flexure amount of the backlight unit subtracted from the flexure amount of the liquid crystal panel is greater than 0.

2. The LCD device of claim 1, wherein the adhesive layer comprises:
  a base film;
  a first adhesive layer formed under the base film, a lower surface of the first adhesive layer forming the first adhesive surface; and
  a second adhesive layer formed on the base film, an upper surface of the second adhesive layer forming the second adhesive surface.

3. The LCD device of claim 2, wherein adhesive strength of the second adhesive layer is less than or equal to the first adhesive layer.

4. The LCD device of claim 1, wherein a separation distance between the first and second regions is proportional to a difference between a flexure amount of the liquid crystal panel and a flexure amount of the backlight unit.

5. The LCD device of claim 1, wherein the separation distance between the first and second regions increases progressively closer to a middle of the adhesive layer.

6. A liquid crystal display (LCD) device, comprising:
  a liquid crystal panel;
  a backlight unit disposed under the liquid crystal panel, and emitting light; and
  an adhesive layer formed between the liquid crystal panel and the backlight unit, and comprising a first adhesive surface adhered to the backlight unit and a second adhesive surface adhered to the liquid crystal panel, the first and second adhesive surfaces being alternately disposed along at least one side of the backlight unit,
  wherein the adhesive layer comprises:
    a first region, the first adhesive surface being formed in the first region; and
    a second region, the second adhesive surface being formed in the second region, and the first and second regions being disposed apart from each other,
  wherein a value of the flexure amount of the backlight unit subtracted from the flexure amount of the liquid crystal panel is less than 0.

7. The LCD device of claim 6, wherein the separation distance between the first and second regions increases progressively farther apart from a middle of the adhesive layer.

8. The LCD device of claim 1, wherein the adhesive layer is disposed on at least one of an upper side, a lower side, a left side, and a right side of the backlight unit.

9. The LCD device of claim 6, wherein the adhesive layer comprises:
  a base film;
  a first adhesive layer formed under the base film, a lower surface of the first adhesive layer forming the first adhesive surface; and
  a second adhesive layer formed on the base film, an upper surface of the second adhesive layer forming the second adhesive surface.

10. The LCD device of claim 9, wherein adhesive strength of the second adhesive layer is less than or equal to the first adhesive layer.

11. The LCD device of claim 6, wherein a separation distance between the first and second regions is proportional to a difference between a flexure amount of the liquid crystal panel and a flexure amount of the backlight unit.

12. The LCD device of claim 6, wherein the adhesive layer is disposed on at least one of an upper side, a lower side, a left side, and a right side of the backlight unit.

13. A liquid crystal display (LCD) device, comprising:
  a liquid crystal panel;
  a backlight unit disposed under the liquid crystal panel, and emitting light; and
  an adhesive layer formed between the liquid crystal panel and the backlight unit, and comprising a base film, a first adhesive surface formed under the base film and adhered to the backlight unit, and a second adhesive surface formed on the base film and adhered to the liquid crystal panel, the first and second adhesive surfaces being alternately disposed along at least one side of the backlight unit, wherein the adhesive layer comprises:

a first region, the first adhesive surface being formed in the first region; and a second region, the second adhesive surface being formed in the second region, and the first and second regions being disposed apart from each other, wherein a separation distance between the first and second regions apart along the base film is proportional to a gap between the liquid crystal panel and the backlight unit, the gap intersecting the separation distance.

14. The LCD device of claim 13, wherein as the gap increases progressively closer to the middle, the separation distance increases progressively closer to the middle of the adhesive layer.

15. The LCD device of claim 13, wherein as the gap increases progressively farther apart from the middle, the separation distance increases progressively farther apart from the middle of the adhesive layer.

16. The LCD device of claim 13, wherein the adhesive layer comprises:

a base film;

a first adhesive layer formed under the base film, a lower surface of the first adhesive layer forming the first adhesive surface; and a second adhesive layer formed on the base film, an upper surface of the second adhesive layer forming the second adhesive surface.

17. The LCD device of claim 13, wherein adhesive strength of the second adhesive layer is less than or equal to the first adhesive layer.

18. The LCD device of claim 13, wherein the adhesive layer is disposed on at least one of an upper side, a lower side, a left side, and a right side of the backlight unit.

19. The LCD device of claim 13, wherein the gap crosses the separation distance.

20. The LCD device of claim 13, wherein the gap is perpendicular to the separation distance.

* * * * *